May 27, 1958 S. E. SHIELDS ET AL 2,836,069
SAMPLING AND METERING DEVICE FOR FLUENT SOLID MATERIALS
Filed Sept. 1, 1955 5 Sheets-Sheet 1

INVENTORS:
Stanley E. Shields
Philip W. Dewey
William A. Shire, Jr.
BY
Everett A. Johnson
ATTORNEY

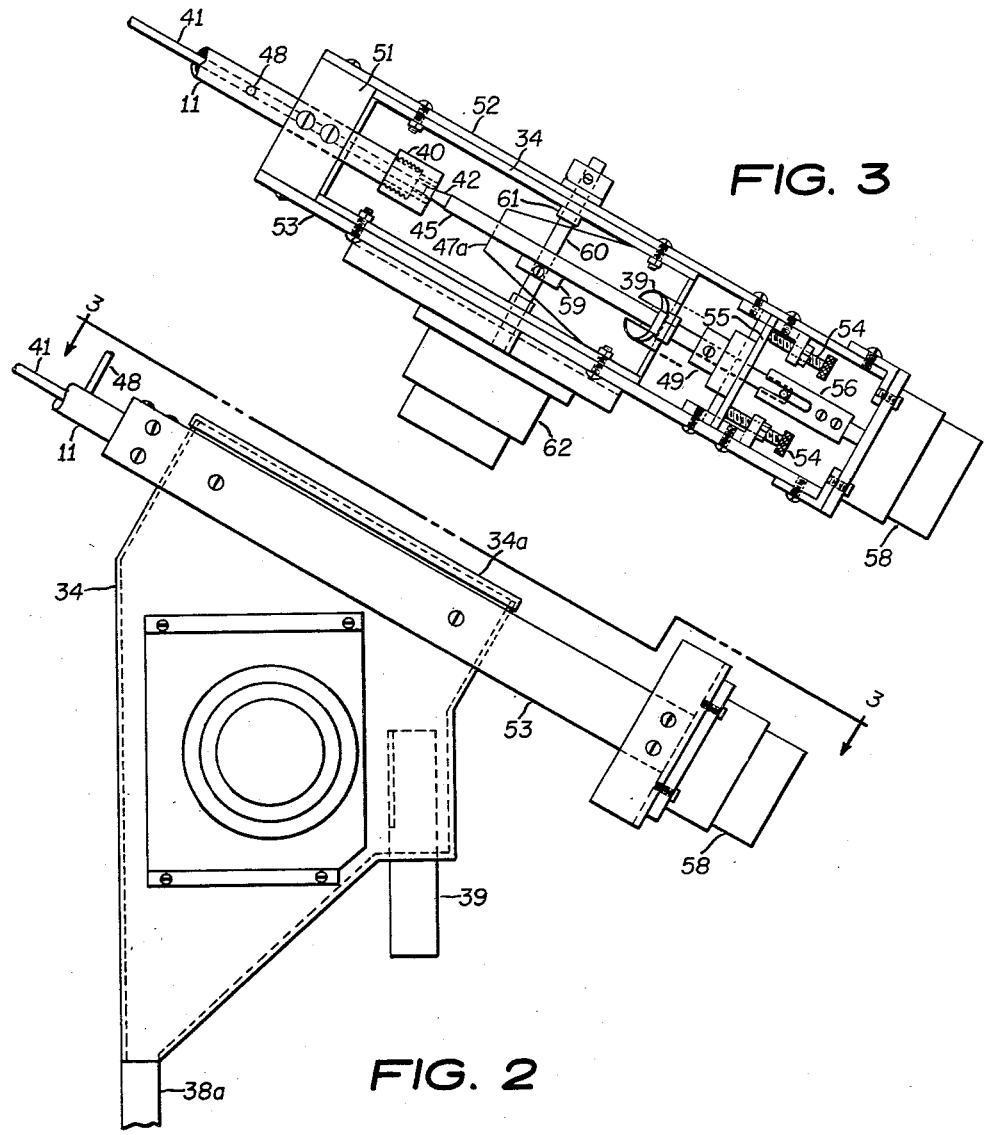

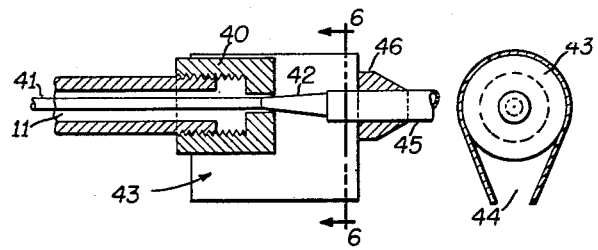
FIG. 6
FIG. 6a
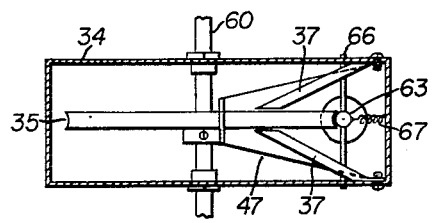
FIG. 5
FIG. 7
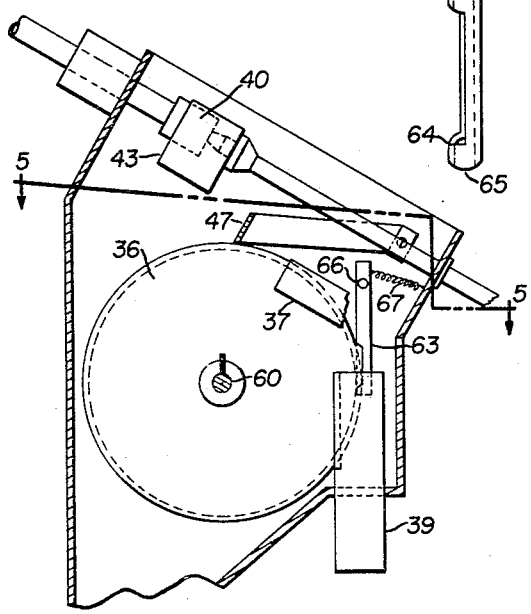
FIG. 4
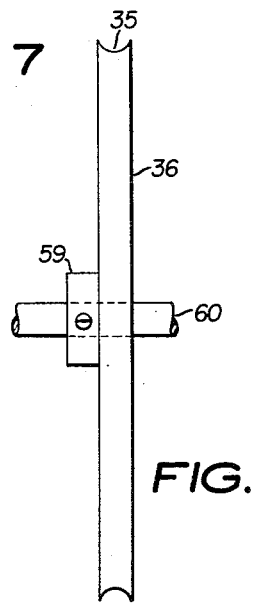
FIG. 8
INVENTORS:
Stanley E. Shields
Philip W. Dewey
William A. Shire, Jr.
BY
Everett A. Johnson
ATTORNEY May 27, 1958  S. E. SHIELDS ET AL  2,836,069
SAMPLING AND METERING DEVICE FOR FLUENT SOLID MATERIALS
Filed Sept. 1, 1955  5 Sheets-Sheet 4
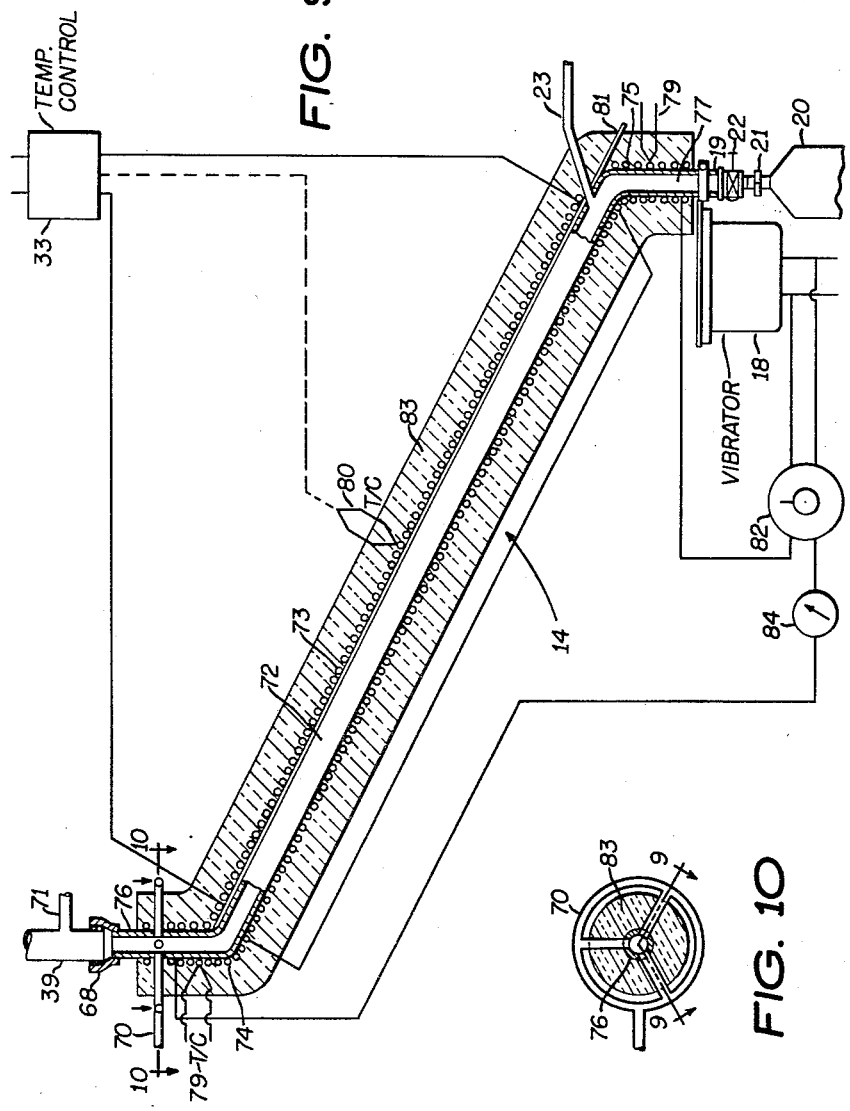
INVENTORS:
Stanley E. Shields
Philip W. Dewey
William A. Shire, Jr.
BY Everett A. Johnson
ATTORNEY

United States Patent Office 2,836,069
Patented May 27, 1958

2,836,069

SAMPLING AND METERING DEVICE FOR FLUENT SOLID MATERIALS

Stanley E. Shields, Whiting, and Philip W. Dewey and William A. Shire, Jr., Munster, Ind., assignors to Standard Oil Company, Chicago, Ill., a corporation of Indiana Application September 1, 1955, Serial No. 532,073

6 Claims. (Cl. 73—424)

This invention relates to an improved method and apparatus for continuous sampling of flowing granular materials. It further pertains to the sampling of fluent solids and analysis thereof for components thereof. It has particular reference to a method and apparatus for measuring continuously the concentration of deposits, such as carbon, on circulating fluid solid catalysts.

In a number of hydrocarbon conversion processes employing finely divided solid catalysts, there is a deposition of carbon or carbonaceous coatings. In regenerating such catalyst material, it is desired to control the regeneration operation in terms of the proportion of carbon on the catalyst. Ordinarily such regeneration may be effected by burning the deposits from the contact material by means of an oxygen-containing gas. To have an efficient regeneration, it is essential that the rate of burning and proportion of oxygen be controlled. Likewise the deposition of carbonaceous deposits on finely divided contacting materials during a reaction or conversion is indicative of the reaction condition. These conditions may be altered from time to time in accordance wth the extent of carbonaceous deposit.

As is well known, the carbon on catalyst can be determined by withdrawing a batch sample from a catalyst mass and thereafter measuring the proportion of carbon. This may be done by conventional test procedures involving the burning of the carbonaceous deposit from the solids and analyzing the combustion gases for $CO_2$. In the usual case where random samples are drawn by operators that are delivered to a technical service laboratory and there measured, the total elapsed time from the drawing of the sample to the reporting back by the laboratory may be several hours. Obviously where large quantities of catalyst materials are being handled, the difference between the control based on information on a continuous sample and that based on information which is several hours late and on random samples is satisfactory neither from the reliability of the test nor the sensitivity of the control operation.

Batch random sampling provides only sufficient data to indicate that an accurately controlled and continuous sampling system would be very useful. An important object is therefore to provide a sampling device for the withdrawal of a uniform increment of finely divided solids from a flowing mass of such solids. A further object of the invention is to provide a fully automatic system for continuously sampling solids from a standpipe and giving a prompt analysis so as to permit process control. A more specific object of this invention is to provide a sampling apparatus useful in a continuous operating system which will give accurate carbon-on-catalyst readings and which is compartively simple in the method of operation as well as in the elements of construction. These and other objects of the invention will become apparent as the more detailed description thereof proceeds.

Briefly the operation of our analyzer is based on the withdrawal of a catalyst sample continuously, precisely metering a portion of the withdrawn sample, removing any deposit from the metered sample by combustion, and measuring the products derived from such combustion. All of these operations are performed in a continuous and automatic manner. The combustion technique of determining carbon deposits on the metered sample of catalyst has been adopted since it affords data of a more precise and reliable quality than is obtainable by variation in such properties of the metered spent catalyst as color, electrical resistivity, density or the like. The invention will be more fully understood from the following detailed description read in conjunction with the accompanying drawings which form a part of the specification and in which:

Figure 2 is an elevation of the solids sampling and metering apparatus;

Figure 3 is a top view of the apparatus in Figure 2;

Figure 4 is an elevation, partly in section, of the device in Figure 2;

Figure 5 is a view taken along the line 5—5 in Figure 4;

Figures 6 and 6a are detailed views of the catalyst nozzle and diverting shield;

Figures 7 and 8 are views of the sample wheel and sample wheel scraper;

Figure 9 is a schematic view of the furnace and control included in the analyzer assembly of Figure 1;

Figure 10 is a cross section taken along the line 10—10 in Figure 9; and

Figure 1:
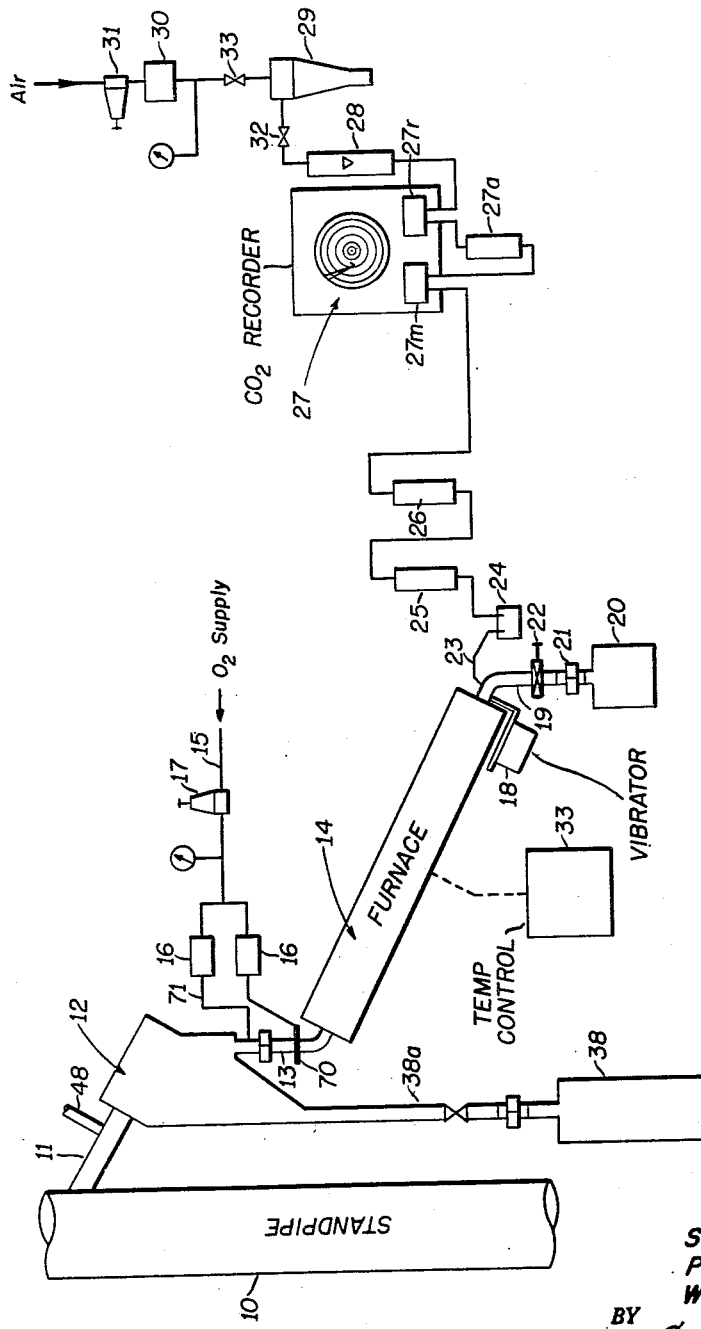
Figure 1 is a schematic flow diagram of our improved carbon-on-catalyst analyzer system.

Referring to Figure 1, the spent catalyst sample taken from the catalyst standpipe 10 issues from the catalyst delivery tube 11 into the catalyst metering assembly 12. The metered sample of catalyst from 12 is introduced by conduit 13 into the furnace 14 wherein the deposit on the catalyst is burned by an oxidizing gas. When oxygen is used it is metered into the furnace 14 from a supply via line 15 at a rate of 10 to 15 times that required to complete combustion of the carbon on the catalyst. A capillary-type flow meter 16 has been found particularly suitable for the metering of the oxygen. To insure constancy of the oxygen supply pressure at the inlet to the flow meter 16, we provide two pressure-reducing regulators in series. The usual type of cylinder pressure regulator is used for initial pressure reduction and the second pressure regulator 17 further reduces the oxygen pressure to that which gives the desired oxygen flow with the particular capillary-type flow meter 16 employed.

In a commercial installation the use of air as the oxidizing gas is preferred, since it avoids the encumbrances of cylinder oxygen. However, when air is used a higher temperature is required in the furnace 14 for an equivalent amount of carbon removal. For example, with a synthetic silica-alumina cracking catalyst having 0.87 percent carbon, a furnace temperature of 1100–1150° F. will give a carbon-free catalyst, whereas with air as the oxidizing gas a temperature of 1250–1300° F. is required for comparable carbon removal. In using air, the oxygen metering set-up can be eliminated since the air comes in directly with the catalyst from the metering assembly housing 12. However, the oxygen injection points can also be left open to draw in air from the surrounding atmosphere by means of the aspirator set-up.

The oxidizing gas, whether air or oxygen, and the catalyst flow concurrently down through the furnace 14. It has been found that installing the furnace tube 14 at an angle of about 30° with the horizontal is conducive to good catalyst flow. To further insure continuity of the catalyst flow, the furnace 14 is vibrated lightly by means of a vibrator 18 such as a Syntron vibrator operating at a frequency of 60 cycles per second.

The regenerated catalyst from the outlet 19 of the furnace 14 is collected in a receiver 20 attached by a coupling 21 for rapid disengagement. A gate valve 22 is provided between the receiver 20 and the furnace 14 to permit operation while the receiver 20 is being emptied.

The effluent combustion gas from the furnace 14 flows successively via line 23 through a water trap 24, a drier tube 25, and a Hopcalite tube 26 before entering the $CO_2$ meter and recorder 27. Any CO in the combustion gas should be converted to $CO_2$ before introduction into the meter 27, and the Hopcalite tube 26 is provided for this purpose. This insures measurement of all the catalyst carbon burned therefrom in the furnace 14 by the oxidizing gas. A thermal conductivity type meter 27 can be used for measuring the $CO_2$ content of the combustion gas. To insure dependable performance of this type of $CO_2$ meter, the combustion gas should be moisture free and water trap 24 and drier tube 25 are provided for this purpose.

The gases issuing from the CO converter tube 26 enter the measuring cell 27m of the $CO_2$ meter 27 where the $CO_2$ content is measured with reference to a standard gas in cell 27r. This may be the gases under test from which $CO_2$ has been removed by means of adsorber 27a containing an adsorbent such as soda lime. The $CO_2$-free stream passes from the adsorber 27a and enters the reference cell 27r. Alternatively, the reference cell 27r may contain a sealed quantity of an appropriate reference gas which may be of background composition, i. e. a sample of combustion gas minus $CO_2$, or pure air. In that event the adsorber 27a is omitted and the combustion gases pass directly from cell 27m to the rotameter 28. Such a sealed reference gas is preferred commercially since it avoids the necessity for renewing the adsorbent in adsorber 27a.

On leaving the $CO_2$ meter 27, the gases pass through the rotameter 28 into a vacuum source means which provides the necessary constant vacuum to draw the gas through the system. This vacuum source may be a pump or blower, or air- or water-operated aspirator, or the like. In the drawing it comprises an aspirator 29 operated with air from an air-supply chamber 30, the pressure on which is controlled by means of a pressure-reducing valve 31. The rate of operating air flow through the aspirator 29 is controlled by a needle valve or orifice 33. A second needle valve or orifice 32 is provided between the rotameter 28 and the inlet of the aspirator 29 to control the volume of oxidizing gases being drawn through the furnace 14.

The flow of the aspirated oxygen or air through the furnace 14 must be uniform to preclude variations in the partial pressure of the $CO_2$ in the combustion gas. Variations in the partial pressure of $CO_2$ resulting from sources other than the carbon on the catalyst would impair the validity of the $CO_2$ meter reading because it is a partial pressure measuring instrument.

Although ten to fifteen times the required volume of the oxidizing gas is metered to the inlet of furnace 14 when commercial oxygen is used, only about eight times the theoretical based on 2 percent carbon on the catalyst is actually drawn through the furnace 14. The excess oxygen diffuses into the surrounding air and minimizes the possibility of dilution of the furnace intake with air. Further, when air is the source of the oxidizing gas, and air is the reference gas in 27r, dilution is not a problem. However, the use of air requires a higher furnace temperature for an equivalent amount of carbon burning per unit time. Such lower temperature operation is desirable in some instances where the regenerated catalyst is periodically returned to the unit because temperatures in excess of about 1100° F.–1150° F. may impair the life and activity of some cracking catalysts. However, in commercial installations where the sample of catalyst analyzed is relatively small and discarded, higher temperatures above about 1100° F.–1150° F. can be used with air as the oxidizing gas. In any event, the temperature of the furnace 14 is controlled at the desired level by temperature-control means 33 as will be described below.

Referring to Figures 2 to 8, and 11, the sampling and metering assembly 12 includes a casing 34 from which the delivery tube 11 extends through the wall of the standpipe 10. Preferably, the tube 11 is horizontal or sloped downwardly.

Figure 11:
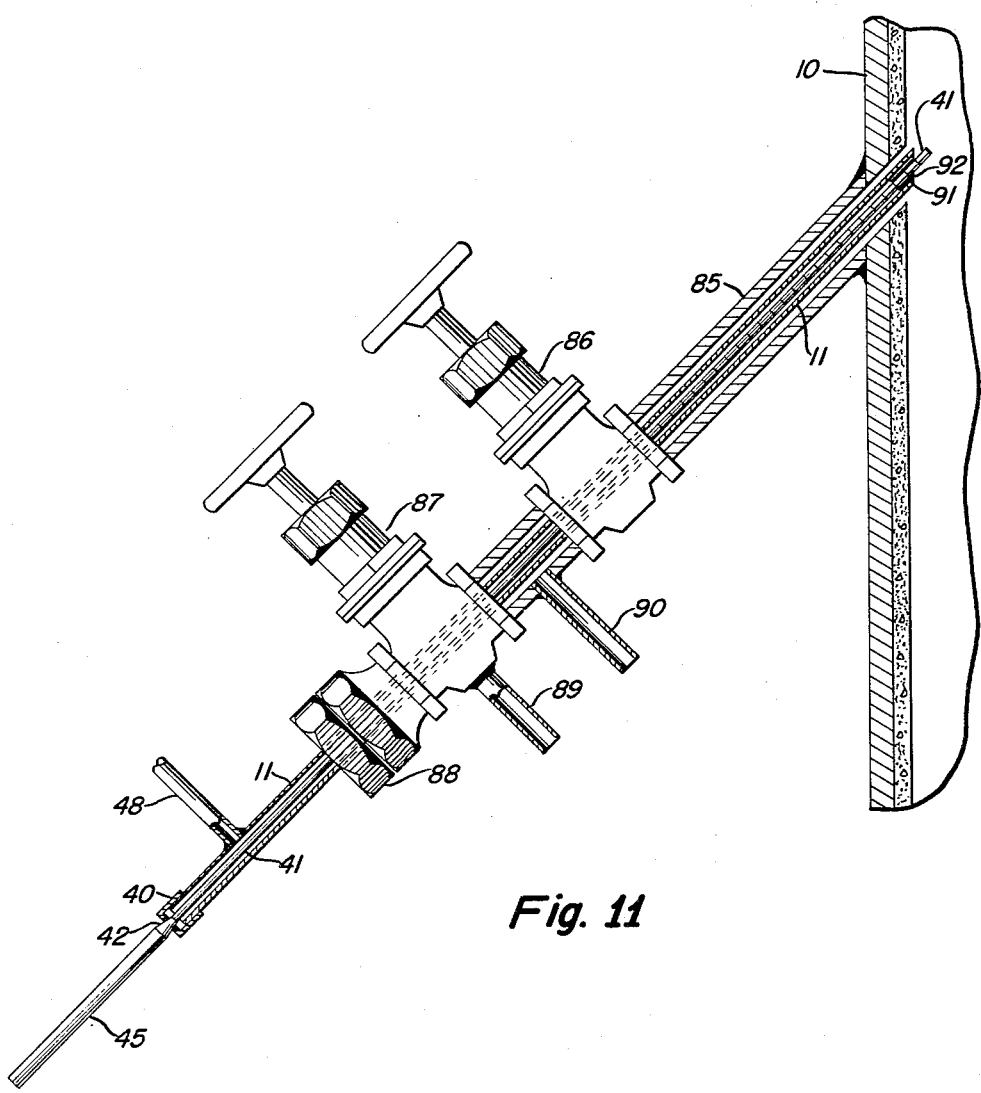
Figure 11 is an enlarged elevation, partly in section, of the catalyst take-off tube.

In Figure 11, we have shown details of a preferred means for introducing the sample tube 11 into the standpipe 10. This includes a conduit pipe means 85 welded to the wall of standpipe 10 at an angle of about 45°. Gate valves 86 and 87 are provided on pipe 85 to permit shutting off the pipe 85 when the sampling line 11 with its contained rod 41 is withdrawn. In such operation, the packing gland 88 is released to permit the withdrawal of the tube 11. During this operation, flushing gas is bled into the pipe 85 by means of bleeds 89 and 90, the introduced gas having the effect of clearing catalyst from the seats of gate valves 86 and 87 and of dislodging catalyst which may have accumulated between the sample tube 11 and conduit take-off pipe 85.

To replace the instrument, the procedure is reversed with an air blowing proceeding the introducing of the sample tube 11. If desired, the sample tube 11 may be provided with index marks to indicate the extent to which the inlet end of the sample tube 11 projects into the standpipe 10.

To prevent the entry of larger masses of solids into the sampling tube 11, we provide an internal sleeve or collar 91 at the upper end of the sampling tube 11 which acts as a lump discriminator by reducing the annular opening at the inlet end of the sample tube 11. The inlet end of the sample tube 11 is mitered so as to present a substantially vertical inlet face 92. This end, however, projects inward into the solids flow so as to sweep away any larger particles which might become lodged about collar 91.

The spent catalyst sample taken from the standpipe 10 issues from the catalyst delivery tube 11 onto the recessed periphery 35 of the catalyst metering wheel 36. The discharge end of the delivery tube 11 is provided with a nozzle 40 through which a rotating rod or spindle 41 extends over the length of the delivery tube 11. The rotating rod 41 has a tapered enlargement 42 which is somewhat larger than the diameter of the nozzle 40. The position of the rotating rod and tapered section with respect to the nozzle 40 is adjusted as will be described below so that a flow rate of catalyst is maintained somewhat in excess of that required to fill the recessed periphery 35.

A catalyst diverting shield 43 is fixed about the nozzle 40 and deflects the catalyst through a downward opening 44 onto the metering wheel 36. A drive shaft 45, which is axially aligned with rod 41 and may be integral therewith, extends through a packing nut 46 on the shield 43.

The excess catalyst is scraped from the wheel 36 by a leveling scraper 47 and a pair of side scrapers 37 mounted on opposite sides of the casing 12. The leveling scraper 47 has a plow portion 47a which rides on the periphery of the wheel 36. The deflected catalyst falls into the excess catalyst receiver 38 from which it may be returned periodically to the catalyst system. As the wheel 36 rotates, the measured quantity of catalyst sample in the peripheral channel 35 of the wheel 36 separates therefrom and falls through the chute 39 into the furnace 14.

The catalyst sample from the delivery tube 11 is discharged through the adjustable annular orifice formed by nozzle 40 and the tapered section 42 of the rod 41. The rotating rod 41 precludes plugging of the discharge tube 11. We have found that performance is more reliable with a delivery tube 11 sloped downwardly, for example at least 30° with the horizontal and preferably 45° as shown in Figure 11.

Aeration of the catalyst by injecting steam or nitrogen or traces of ammonia gas through bleed 48 in the delivery tube 11 is desirable. In fact, some catalysts with poor flowing characteristics will not flow uniformly unless so aerated. The presence of ammonia in the housing 34 also minimizes sticking of the catalyst to the metering wheel 36. The ammonia gas can be injected from a liquid ammonia source either alone or together with nitrogen and/or steam. Another source of ammonia gas found operable is the use of a wick in a container of aqueous ammonium hydroxide suspended within the metering assembly 12.

The slope of the tube 11 together with the rotating rod 41, collar 91, and aeration bleed 48 result in a uniform flow of the solids from the standpipe to the collection vessel 20. If desired, the temperature of the delivery tube 11 can be raised with an appropriate jacket heater (not shown) which improves the catalyst flow characteristics by preheating the catalyst.

The catalyst issues from the nozzle 40 continuously but at a variable flow rate. Such variability does not impair the performance of the catalyst sampling device provided that the flow rate is maintained above the minimum necessary to fill the recessed periphery 35 of the catalyst metering wheel 36. Any excess catalyst delivered by tube 11 onto the metering wheel 36 is deflected by leveling scraper 47 and side scrapers 37 into the excess catalyst receiver 38 from which it can be returned manually or automatically to the catalyst standpipe 10 or some other point in the catalyst system.

The metering wheel 36 rotating at a selected rate, for example of about 22.5 revolutions per hour, carries the catalyst in the periphery 35 downward and discharges it into chute 39 leading into a sample collector or a furnace. The rate of rotation is dependent upon the dimensions of the recessed peripheral channel for any pre-selected catalyst flow rate. The wheel 36 illustrated may be about 4.5 inches in diameter with a channel 35 having a radius of about 0.125 inch. Other sizes and shapes of continuous peripheral channels 35 can be used, however.

With some types of solids there may be a tendency to stick in the channel 35 due to electrostatic forces. These forces tending to hold the catalyst particles together can be dissipated by providing a source of alpha particles within the periphery 35 of the metering wheel 36 and such dissipation assists subsequent removal of the catalyst by gravity flow into chute 39. The channel 35 can for example be plated or treated with an alpha particle emitting substance such as radium or some isotope of radium. This ionizes the surrounding air which promotes dissipation of the electrostatic charges of the catalyst particles which might otherwise cause agglomeration and sticking thereof within the channel.

In a typical installation, the inclined delivery tube 11 comprises a section of standard stainless steel seamless tubing of about 0.270 inch I. D. provided with a nozzle orifice 40 threaded about the end thereof. The tube 11 is supported in the assembly by means of block 51 arranged between the frame members 52 and 53 which are in turn fixed to the casing 34. A rod 41 is aligned with respect to the axis of the tube 11 and the orifice in nozzle 40 by means of a thrust bearing 49 mounted on adjustable thrust plate 55 and a contact bearing 46 carried by the catalyst diverting shield 43.

The rotating rod 41 has a tapered section 42 about 0.5 inch long which flares gradually over its length from about 0.125 inch to about 0.150 inch diameter. The tapered section 42 extends within the orifice 40, which may be about 0.1407 inch in diameter, to provide an annular opening through which the solids are discharged from the delivery tube 11. Screws 54 contact the thrust plate 55 which adjustably carries the thrust bearing 49.

A slide coupling 56 links the end of the drive shaft 45 with the motor 58 supported by the frame members 52 and 53, the motor 58 being adapted to rotate the rod 41 through shaft 45 at about 180 revolutions per hour.

The wheel 36 is fixed by hub 59 to the axle 60 which is journaled in opposite sides of the casing 34 in bearings 61. A motor 62 mounted on the side of the casing 34 drives the axle 60 directly at about 22.5 R. P. H. It should be understood, however, that for a given metering rate the speed of rotation of the metering wheel is a function of the dimensions of the recessed periphery.

A wheel scraper 63 is pivotally mounted near its upper end on shaft 66 and held in contact with the periphery 35 of the metering wheel 36 by tension spring 67. The scraper 63 comprises an elongated hollow cylinder with a wall segment removed so as to provide a scraping edge 64 which conforms to the peripheral channel 35 in the metering wheel 36 to dislodge the catalyst and direct it downwardly through the lower end 65 of the hollow scraper 63.

Referring to Figures 1 and 4, oxygen from flow meter 16 is injected through a plurality of orifices 70 and also through a tube 71 discharging into the catalyst chute 39. The major proportion of oxygen is introduced through the plurality of orifices 70 whereas the central tube 71 carries only sufficient oxygen to maintain an oxygen atmosphere within the catalyst inlet chute 39. If air is used as the oxidizing gas a simplified system can be provided by eliminating the flow meter 16 and drawing in air via 70 and 71 or simply through the open housing 34. It is also found advantageous to space chute 39 with respect to coupling 68 so that an 0.125 inch air space separates the chute peripherally from the coupling.

The furnace 14 comprises in one embodiment a four-foot section of 0.5 inch seamless, stainless steel tube 72 wound with a beaded Nichrome wire heater means distributed over its full length. A first heater unit 73 of about 1000 watts covers the 36-inch central section of the furnace tube whereas an inlet heater unit 74 of about 90 watts and an outlet heater unit 75 of about 60 watts covers the six-inch end sections 76 and 77. The entire unit or furnace 14 may be enclosed by a suitable heat insulation 83 as shown in the drawings.

Thermocouples 78, 79 and 80 are fixed to the outer furnace wall at the center of each of the three heater sections 73, 74 and 75. An exploratory thermowell 81 is provided for exploring temperatures along the entire length of the furnace tube 72 below the heater coil 73. The end heaters 74 and 75 may be controlled manually by means of variable transformer 82 and the associated conductors; whereas the central heater 73 is controlled by a millivoltmeter on-off type temperature controller 33. It is contemplated, however, that for most applications all the heaters can be sized and wound appropriately for direct operation in series from an 115 volt A. C. source and controlled by controller 33.

The time required for the analyzer to respond to changes in deposit concentrations is dependent upon the solids residence time within the furnace, the solids transportation rate to the furnace, and the gas transportation rate to the product gas meter. The over-all time lag can be kept at a minimum by operating with a high furnace temperature which is permissible in most commercial applications. Use of such high furnace temperatures accelerates the rates of combustion, thereby lowering the minimum solids residence time within the furnace and permitting the use of a furnace of smaller volume. In any event the system described enables an operator to obtain prompt indications of significant variations in the components of the solids and enables the operator to take corrective measures. Thus to reduce a carbon deposit on catalysts, the feed-to-catalyst ratio in the reactor is reduced and/or the flow of catalyst from the regenerator can be cut back. Hence, the objects of our invention have been attained and we have provided a novel system both for metering finely divided solids from a continuous flowing stream and a system for automatically and continuously analyzing solids for deposits.

This application is a continuation-in-part of our copending application Serial No. 234,638, filed June 30, 1951 and entitled "Continuous Carbon-on-Catalyst Analyzer," now U. S. Patent 2,753,246.

Although our invention has been described in terms of specific apparatus which is described in considerable detail, it should be understood that this is by way of illustration only and that our invention is not limited thereto. Alternative embodiments and operating techniques will become apparent to those skilled in the art in view of the description therein, and accordingly it is contemplated that modifications in both the method and the apparatus of our invention can be made without departing from the spirit of the described invention.

What we claim is:

1. A sampling and metering device for fluent solid materials comprising in combination a sampling tube discharging within a metering chamber, an aeration gas supply line entering said tube through a wall thereof, an adjustable and rotatable rod extending longitudinally within said tube, a tapered section on said rod adjacent the outlet of said tube forming an adjustable annular orifice at the end of said tube, a driven metering wheel mounted to rotate in subjacent alignment with said orifice, a continuous peripheral recess in said wheel adapted to receive a quantity of finely divided solids therein, a tubular scraper arranged to scrape the bottom of said wheel recess to discharge a metered amount of solids from said recess into said chamber, and gravity means for transferring the metered amount of solids from said chamber.

2. A sampling and metering device for fluent solid materials comprising in combination a solids delivery tube discharging within a metering chamber, an aeration gas inlet intermediate the ends of said tube, an adjustable and rotatable rod extending within and beyond the discharge end of said tube, a tapered section on said rod adjacent the outlet of said delivery tube forming an annular orifice with the end of said tube, a metering wheel mounted to rotate in subjacent alignment with said orifice, a continuous peripheral recess in said wheel adapted to retain a quantity of finely divided solids therein, drive means for rotating said rod and said wheel, leveling scraper means straddling the rotatable metering wheel, recess-conforming wheel scraper arranged tangentially of said wheel for discharging metered amount of solids from said recess, and a chute arranged below said wheel in alignment with the said wheel scraper.

3. The device of claim 2 which includes a diverting shield about the discharge end of said tube directing solids onto said metering wheel.

4. The sampling and metering device for fluent solid materials comprising in combination a solids delivery tube discharging within a metering chamber, an adjustable and rotatable rod extending throughout the length of said tube, said rod having a tapered section adjacent the outlet of said delivery tube which forms an annular orifice with said tube, means for rotating said rod, a metering wheel mounted to rotate below said orifice in alignment therewith, a continuous peripheral recess in said wheel adapted to retain a quantity of finely divided solids therein, a leveling scraper element straddling the rotatable metering wheel above the axis of rotation of said wheel and riding on the periphery of said wheel, a metered solids chute arranged below said wheel and in alignment with the wheel a distance from the axis of rotation equal to about the radius of said wheel, an elongated wheel scraper extending tangentially of said wheel and having a portion within the said recess, said scraper discharging metered solids into said metered solids chute, a motor means for driving said wheel, and an excess catalyst reservoir below said metering wheel and said leveling scraper whereby excess solids are collected separate from the solids discharged into said chute.

5. The apparatus of claim 1 including a sleeve fixed within the inlet end of said sample tube restricting the flow area between said rotated rod and tube.

6. The apparatus of claim 1 which includes a leveling scraper means extending transverse to the peripheral recess to level a metered amount of solids therein and wherein said tubular scraper for removing the metered amount of solids is resiliently pivoted adjacent to said metering wheel with its axis extending tangent thereto.

References Cited in the file of this patent

UNITED STATES PATENTS

| | | |
|---|---|---|
| 26,582 | Van Gelder | Mar. 20, 1860 |
| 518,915 | Clarkson | Apr. 24, 1894 |
| 1,092,741 | Nagel | Apr. 7, 1914 |
| 1,362,968 | Stewart | Dec. 21, 1920 |
| 2,301,815 | Robison | Nov. 10, 1942 |